No. 853,060. PATENTED MAY 7, 1907.
W. L. CARTER.
ROTARY WAFFLE IRON.
APPLICATION FILED FEB. 25, 1907.

2 SHEETS—SHEET 1.

Witnesses
C. Muntzer
C. H. Griesbauer

Inventor
Wilson L. Carter
by H. B. Willson & Co.
Attorneys

THE NORRIS PETERS CO., WASHINGTON, D. C.

No. 853,060. PATENTED MAY 7, 1907.
W. L. CARTER.
ROTARY WAFFLE IRON.
APPLICATION FILED FEB. 25, 1907.
2 SHEETS—SHEET 2.
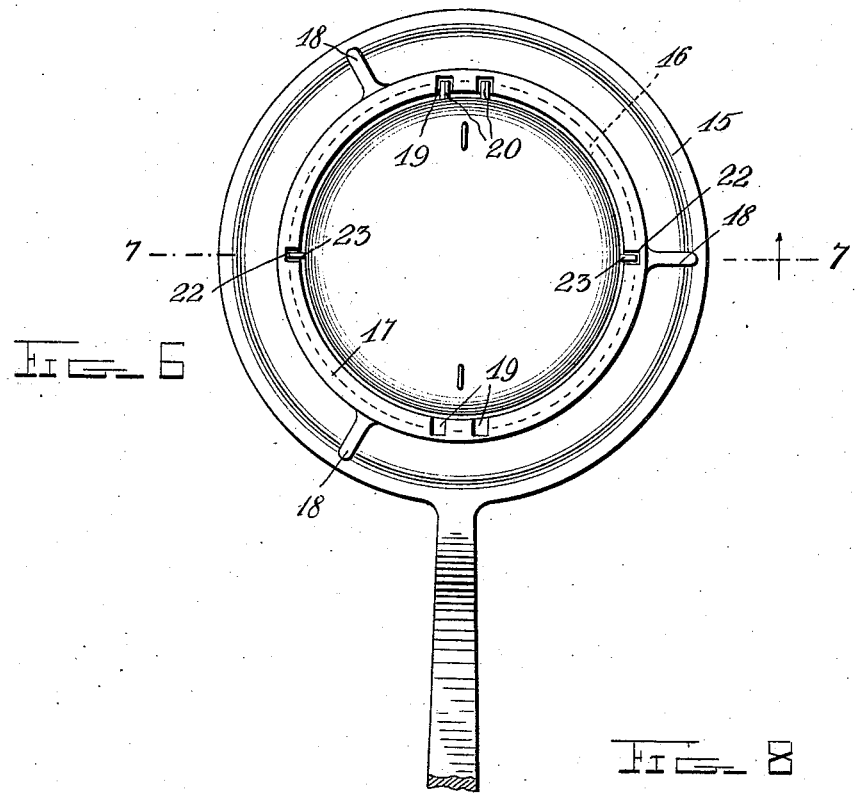
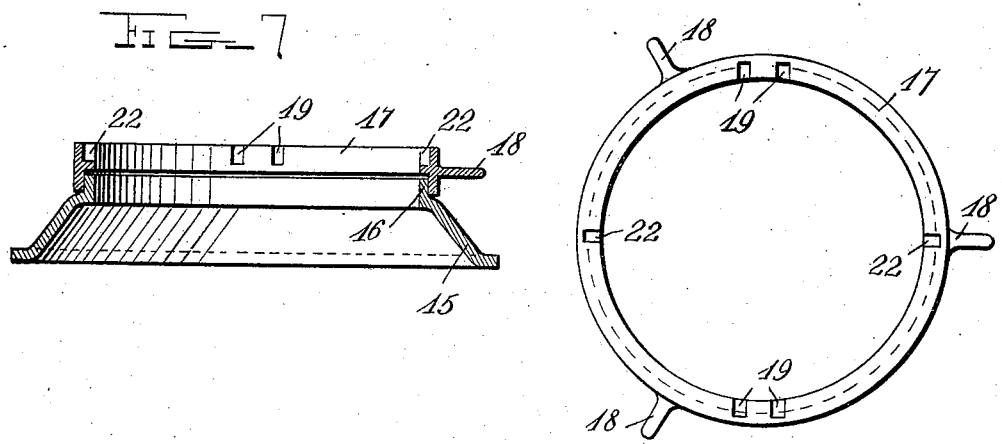
Witnesses
C. Meenter
E. H. Greenbauer
Inventor
Wilson L. Carter
by H. B. Willson & Co.
Attorneys
THE NORRIS PETERS CO., WASHINGTON, D. C.

UNITED STATES PATENT OFFICE.

WILSON LEWIS CARTER, OF GULFPORT, MISSISSIPPI.

ROTARY WAFFLE-IRON.

No. 853,060.　　　Specification of Letters Patent.　　　Patented May 7, 1907.

Application filed February 25, 1907. Serial No. 359,090.

*To all whom it may concern:*

Be it known that I, WILSON LEWIS CARTER, a citizen of the United States, residing at Gulfport, in the county of Harrison and State of Mississippi, have invented certain new and useful Improvements in Rotary Waffle-Irons; and I do declare the following to be a full, clear, and exact description of the invention, such as will enable others skilled in the art to which it appertains to make and use the same.

This invention relates to waffle irons.

When a waffle iron is placed over a fire in a stove, all parts thereof are not heated evenly as the stove on the draft side is at all times several degrees cooler than at other parts. With the iron now in use, it is necessary to rotate the iron bodily many times to insure an even cooking of the waffle.

The object of the invention is to provide a waffle iron, the supporting base or rim of which with its attached handle remains stationary while the batter containing receptacle or cup may be rotated to expose all parts of the waffle to the hot portion of the fire and insure an even browning of the waffle at all points.

Figure 1:
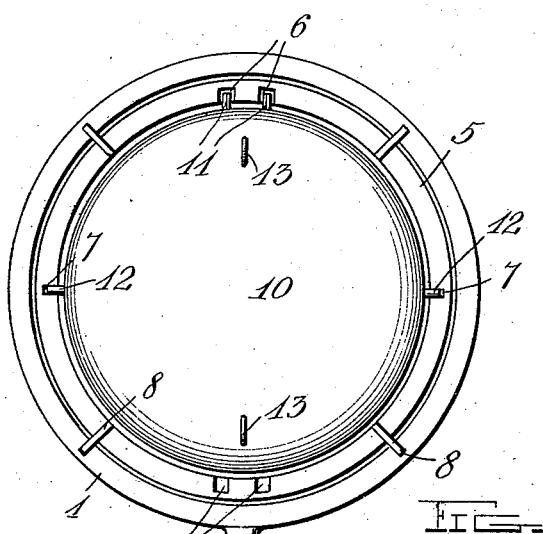
Figure 2:
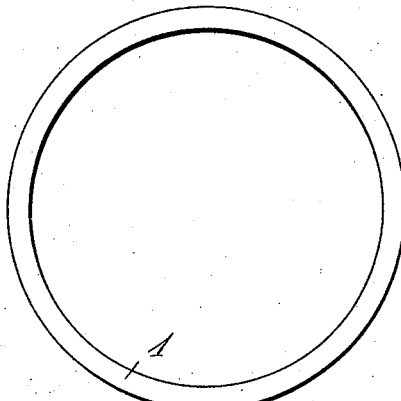
Figure 3:
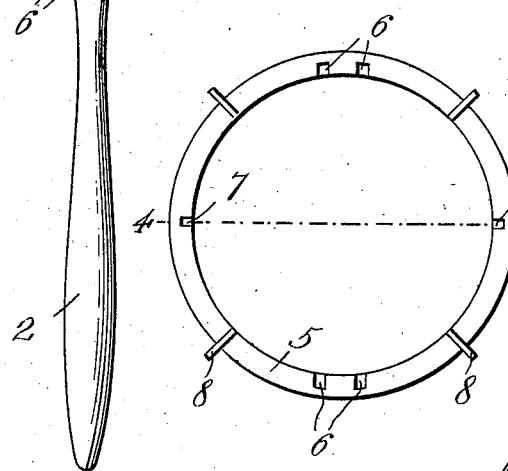
Figure 5:
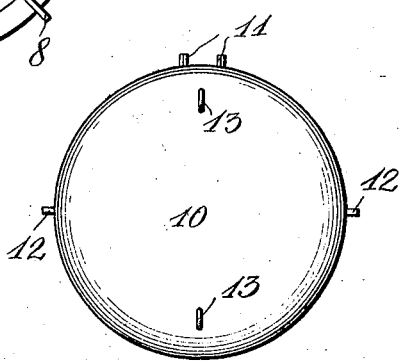
Figure 4:
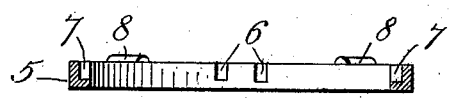

In the accompanying drawings, Figure 1 represents a top plan view of a waffle iron embodying this invention; Fig. 2 represents a top plan view of the supporting rim or base; Fig. 3 represents a top plan view of the band; Fig. 4 represents a vertical section of the band taken on the line 4—4 of Fig. 3; and Fig. 5 represents a top plan view of the batter receptacle or cup detached. Fig. 6 represents a top plan view of a waffle iron showing a modified form of the invention; Fig. 7 represents a vertical section on line 7—7 of Fig. 6, the batter receptacle being removed; and Fig. 8 represents a top plan view of the rotary band.

In the embodiment illustrated in Figs. 1 to 5, the supporting base, 1, is preferably made in the form of a ring, in which an annular band, 5, is adapted to rotate. This base member has a handle, 2, secured thereto or made integral therewith. The annular band, 5, is also provided with diametrially opposite pairs of notches or sockets, as 6, to receive the hinges, 11, of the batter receptacle or cup, 10. This band, 5, is also provided with sockets, as 7, for receiving the bearing studs, as 12, of the batter receptacle, 10, and is also provided with spaced projections or studs, as 8, by means of which the band, 5, may be supported and rotated on the base, 1. The batter receptacle or cup, 10, is of ordinary construction and is provided on its opposite face with perforated lugs or loops, as 13, for opening the iron and rotating it together with the band.

In the form shown in Figs. 6 and 8, the ring-shaped supporting base, 15, has an upwardly extending annular flange, 16, offset therefrom and over which the band, 17, loosely fits and is adapted to rotate. This band, 17, is of about twice the height of the flange, 16, and is provided with laterally extending spaced lugs, 18, for rotating it; it also has diametrically disposed notches, as 19, to receive the hinges, 20, of the batter receptacle. In this band, 17, are also formed sockets, as 22, for receiving the bearing studs, as 23, of the batter receptacle, 21.

Any suitable implement may be used for manipulating the iron and for removing the waffles therefrom.

I claim as my invention:—

1. A rotatable waffle iron comprising a supporting base having a round opening therein, an annular band rotatably mounted on said base, and a batter receptacle journaled to swing in said band and adapted to rotate therewith.

2. A rotatable waffle iron comprising a supporting base having a circular opening therein, an annular band fitting in said opening in said base and having spaced lugs resting on the upper face thereof, and a batter receptacle journaled to swing in said band and adapted to rotate therewith.

In testimony whereof I have hereunto set my hand in presence of two subscribing witnesses.

WILSON LEWIS CARTER.

Witnesses:
　DAVID WEBSTER,
　JOSEPH S. COMISSIONG.